US009837222B2

(12) United States Patent
Knospe

(10) Patent No.: US 9,837,222 B2
(45) Date of Patent: Dec. 5, 2017

(54) WORKING CYLINDER FOR A DRIVE OF AN ELECTRIC CIRCUIT BREAKER

(71) Applicant: ABB Technology AG, Zürich (CH)

(72) Inventor: Jörg Knospe, Bruchköbel (DE)

(73) Assignee: ABB Schweiz AG, Baden (CH)

( * ) Notice: Subject to any disclaimer, the term of this patent is extended or adjusted under 35 U.S.C. 154(b) by 138 days.

(21) Appl. No.: 14/560,540

(22) Filed: Dec. 4, 2014

(65) Prior Publication Data

US 2015/0083563 A1 Mar. 26, 2015

Related U.S. Application Data

(63) Continuation of application No. PCT/EP2013/001615, filed on Jun. 3, 2013.

(30) Foreign Application Priority Data

Jun. 5, 2012 (DE) ........................ 10 2012 011 130

(51) Int. Cl.
*H01H 31/02* (2006.01)
*H01H 31/28* (2006.01)
(Continued)

(52) U.S. Cl.
CPC .............. *H01H 3/301* (2013.01); *H01H 3/24* (2013.01); *H01H 3/3031* (2013.01);
(Continued)

(58) Field of Classification Search
CPC .. H01H 3/24; H01H 3/54; H01H 3/32; H01H 3/22; H01H 3/605; H01H 9/0005;
(Continued)

(56) References Cited

U.S. PATENT DOCUMENTS 2,450,819 A * 10/1948 Whelan .................... H01H 3/24 200/61.68
2,807,140 A * 9/1957 Ransom .................. F15B 11/05 417/219
(Continued)

FOREIGN PATENT DOCUMENTS

CN 1371111 A 9/2002
DE 1152469 B 8/1963
(Continued)

OTHER PUBLICATIONS

International Search Report (PCT/ISA/210) dated Sep. 116, 2013, by the European Patent Office as the International Searching Authority for International Application No. PCT/EP2013/001615.
(Continued)

*Primary Examiner* — Anthony R. Jimenez
(74) *Attorney, Agent, or Firm* — Barnes & Thornburg LLP

(57) ABSTRACT

An exemplary working cylinder for a drive of an electric circuit breaker includes a base that includes a cylinder head and a cylinder body that are connected to one another. Additional components are fastened to the cylinder head as a core piece of the drive, and a thrust ring is guided on an outer surface of the cylinder body. The thrust ring compresses mechanical springs in the mechanical resilient energy storage device by way of a storage piston in a storage module.

17 Claims, 3 Drawing Sheets

(51) Int. Cl.

| | |
|---|---|
| ***H01H 31/32*** | (2006.01) |
| ***H01H 3/30*** | (2006.01) |
| ***H01H 33/34*** | (2006.01) |
| ***H01H 3/24*** | (2006.01) |

(52) U.S. Cl.
CPC .......... *H01H 3/3052* (2013.01); *H01H 33/34* (2013.01); *H01H 2221/008* (2013.01); *H01H 2235/016* (2013.01); *H01H 2239/044* (2013.01)

(58) Field of Classification Search
CPC ...... H01H 9/0027; H01H 71/00; H01H 71/02; H01H 71/10; H01H 2003/00; H01H 2003/02; H01H 2003/30; H01H 2003/32; H01H 2003/46; H01H 31/02; H01H 31/28; H01H 31/32; H01H 33/34; F15B 15/222
USPC ........................................................ 200/48 R
See application file for complete search history.

(56) References Cited

U.S. PATENT DOCUMENTS

| | | | | |
|---|---|---|---|---|
| 2,933,069 A | | 4/1960 | Gratzmuller | |
| 3,207,871 A | * | 9/1965 | Dally | G01L 9/0089 200/46 |
| 5,181,585 A | * | 1/1993 | Braun | F16N 25/04 184/6.28 |
| 2002/0066719 A1 | | 6/2002 | Takagi et al. | |

FOREIGN PATENT DOCUMENTS

| | | | |
|---|---|---|---|
| DE | 1515773 | A1 | 11/1969 |
| DE | 2827817 | A1 | 1/1979 |
| DE | 91 13 366 | U1 | 12/1991 |
| DE | 19637052 | A1 | 3/1998 |
| DE | 30132164 | T2 | 1/2009 |
| DE | 10 2009 015 881 | A1 | 10/2010 |
| EP | 1 213 734 | A2 | 6/2002 |
| GB | 1 120 315 | A | 7/1968 |
| SU | 147635 | A1 | 11/1961 |

OTHER PUBLICATIONS

International Preliminary Report on Patentability (Form PCT/IPEA/409) dated Jun. 4, 2014, by the European Patent Office in corresponding International Application No. PCT/EP2013/001615. (19 pages).

* cited by examiner

WORKING CYLINDER FOR A DRIVE OF AN ELECTRIC CIRCUIT BREAKER

RELATED APPLICATION(S)

This application claims priority under 33 U.S.C. §120 to International application no. PCT/EP2013/001615 filed on Jun. 3, 2013, designating the U.S., and claiming priority to German application no. 10 2012 011 130.4 filed on Jun. 5, 2012 in Germany. The content of each prior application is hereby incorporated by reference in its entirety.

FIELD

The present disclosure relates to a working cylinder for a drive of an electric circuit breaker, for example for use in medium voltage or high voltage switching devices, where said working cylinder including a base body.

BACKGROUND INFORMATION

Circuit breakers can interrupt a transfer of electric energy within a few milliseconds in electric switching devices. A drive of a circuit breaker of this type should therefore transfer the energy to the circuit breaker within the few milliseconds in which the switching process is to be performed.

Known circuit breakers are only switched a few times during an operating year, such as if a short circuit occurs. In addition, the circuit breaker is installed for many decades. In this respect, a drive of a circuit breaker should demonstrate not just a high level of instantaneous reliability but also need little maintenance.

Based on this background, DE 10 2009 015 881 A1 discloses a hydromechanical drive having a working cylinder that actuates a circuit breaker through a piston rod. This drive includes an energy storage device and a hydraulic device for transmitting energy that is stored in the energy storage device.

The known hydromechanical drive stores the energy for the switching process in metal springs of a resilient energy storage device, wherein the hydraulic device ensures that energy is transmitted in a low loss and low wear manner during the switching process.

However, the hitherto known hydraulic devices includes working cylinders that are constructed in a relatively complex manner. The known drives include single part working cylinders with a complex structure and said cylinders call for diverse components such as a tank housing, supporting pipes and damping rings. The production process for these complex working cylinders is extremely complex and is accompanied by high costs.

For example, the running surfaces for a piston rod of the working cylinder can be anodized. This is encumbered with a high outlay and consequently high costs. In the case of using aluminum, cavitation damage can occur that can cause technical problems.

SUMMARY

An exemplary drive for an electric circuit breaker of a high voltage switching device is disclosed, comprising: a mechanical resilient energy storage device; and a hydraulic device for transferring energy that can be stored in the mechanical resilient energy storage device, wherein the hydraulic device includes a working cylinder and the working cylinder includes a base body, wherein a piston rod is guided in the working cylinder, and a moving contact member of the electric circuit breaker is actuated via the piston rod, wherein the base body is formed of two separate components including a cylinder head and a cylinder body, and wherein said components are fastened to one another, additional components are fastened to the cylinder head as a core piece of the drive, and a thrust ring is guided on an outer surface of the cylinder body, which thrust ring compresses mechanical springs in the mechanical resilient energy storage device by way of a storage piston in a storage module.

An exemplary drive for an electric circuit breaker of a high voltage switching device is disclosed, comprising: a mechanical resilient energy storage device; and a hydraulic device for transferring energy that can be stored in the mechanical resilient energy storage device, wherein the hydraulic device includes a working cylinder and the working cylinder includes a base body, wherein a piston rod is guided in the working cylinder, and a moving contact member of the electric circuit breaker is actuated through the piston rod, wherein the base body is formed of separate first and second components, and wherein said first and second components are fastened to one another, additional components are fastened to the first component as a core piece of the drive, and a thrust ring is guided on an outer surface of the second component, which thrust ring compresses mechanical springs in the mechanical resilient energy storage device by way of a storage piston in a storage module.

BRIEF DESCRIPTION OF THE DRAWINGS

In the following, the disclosure will be described in greater detail by means of some embodiments with reference to the accompanying drawings, in which.

DETAILED DESCRIPTION

Figure 1:
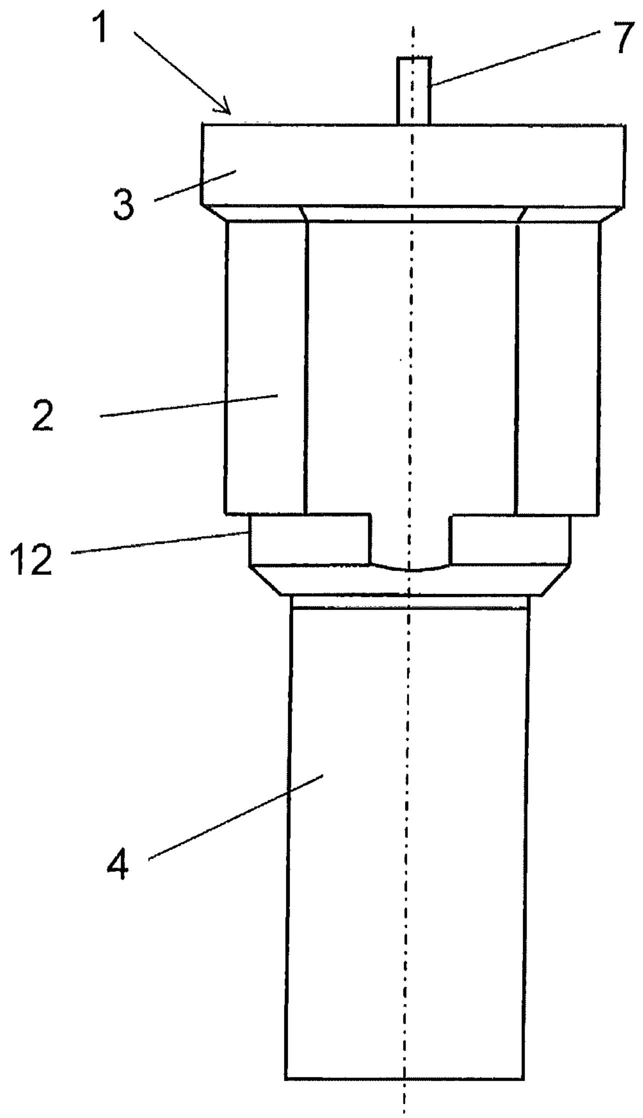
FIG. 1 illustrates a two part working cylinder of a drive for an electric circuit breaker in addition to a piston rod that is arranged coaxially in the working cylinder in accordance with an exemplary embodiment of the present disclosure.

Exemplary embodiments of the present disclosure provide a working cylinder for a drive of an electric circuit breaker that after a problem-free and cost-effective production process demonstrates a long service life and can be combined with existing drives in a technically problem-free manner.

In accordance with exemplary embodiments described herein, the working cylinder includes base body produced from a first component, namely a cylinder head, and a second component, namely a cylinder body, that is connected to the first component.

In accordance with an exemplary embodiment of the present disclosure, production problems can be overcome by using two separate components that are combined to form a working cylinder. Furthermore, different materials can be used in order to produce the working cylinder.

In accordance with another exemplary embodiment of the present disclosure, the hydraulic device can be closed by through a separate cylinder head in a problem-free manner, wherein further components can be fastened to the cylinder head as a core piece of the drive. Prior to this, the cylinder head with all its connection sites for further components can be produced independently from the cylinder body.

Furthermore, a separate cylinder body can likewise be produced separately from the cylinder head and in a manner that is almost independent from the cylinder head as far as the material is concerned. Possible running surfaces for piston rods can be processed independently from the cylinder head. A working cylinder can thus be relatively easily produced in a modular manner and can be combined from two independently produced components.

A working cylinder for a drive of an electric circuit breaker can be provided and said working cylinder demonstrates a long serviceable life after a problem-free and cost-effective production process and can be combined with existing drives in a technically problem-free manner.

According to an exemplary embodiment of the present disclosure, the cylinder head is advantageously connected to the cylinder body in a non-positive locking manner. As a consequence, the two components are securely connected to one another in a loss-proof manner.

According to yet another exemplary embodiment disclosed herein, the cylinder head and the cylinder body are connected to one another by through screws. Screw connections are cost-effective and connect the components to one another in a reversible and detachable manner.

An exemplary piston rod is advantageously guided in the working cylinder. A moving contact member of an electric circuit breaker is reliably actuated by through a piston rod.

The piston rod advantageously includes a piston that is in contact with a running surface of the cylinder body. As a result, the piston rod can be guided in the working cylinder in a tilt-free and low friction manner.

According to exemplary embodiments described herein, the piston rod is advantageously in physical contact with the cylinder head. As a result, the piston rod is guided at at least two positions in the working cylinder, namely once in the cylinder body and once in the cylinder head. As a consequence, canting or tilting of the piston rod is avoided.

The exemplary piston rod of the present disclosure is furthermore advantageously positioned in a coaxial manner with respect to the working cylinder and is received in a central through-going passage in the working cylinder. As a consequence, the piston rod can be easily pushed into the working cylinder from one side.

An exemplary drive for an electric circuit breaker including a mechanical resilient energy storage device and a hydraulic device for transferring energy that can be stored in a resilient energy storage device advantageously includes a working cylinder of the type described here. Specifically, the hydraulic device includes a working cylinder of this type.

According to an exemplary embodiment, the following components are advantageously arranged at connection sites of the cylinder head, for example through screw connections:

Three storage modules, a control block, a pressure release lever having a spring travel switch, a pump module having a motor, a tank cover having a guiding bush, a filling port and associated venting port, an intermediate housing, and the cylinder body.

According to another exemplary embodiment, the following components are advantageously placed in the cylinder head.

A latching bolt, a relief valve, at least one non-return valve, a P-cover that is used as a guide for the piston rod, diverse sealing plugs and also at least one flange plate.

A contour is advantageously incorporated into the cylinder head as a damping ring in lieu of a damping ring. Therefore, a construction including fewer parts can be achieved and said construction does not include a deformable damping ring.

The outer contour of the cylinder head is advantageously used as a bearing surface for supporting a thrust ring of the resilient energy storage device.

Hydraulic connection sites for different components are advantageously provided through connecting bushes.

As a consequence, hydraulic oil can flow into different components. The entire volume of the hydraulic oil can be advantageously made available in the cylinder head itself.

A thrust ring is advantageously guided on the outer surface of the cylinder body. This thrust ring compresses mechanical springs in the mechanical resilient energy storage device by way of storage piston in a storage module.

Furthermore, a base plate can be advantageously fastened to the cylinder body. The base plate is used as a counter surface for the mechanical springs.

A plug and a damping ring are advantageously placed in the cylinder body itself.

A connecting bush is advantageously arranged between the cylinder head and the cylinder body. As a consequence, a duct (alternating pressure) can be connected.

FIG. 1 illustrates a two part working cylinder of a drive for an electric circuit breaker in addition to a piston rod that is arranged coaxially in the working cylinder in accordance with an exemplary embodiment of the present disclosure. For example, FIG. 1 illustrates an exemplary working cylinder 1 for a drive (not illustrated) of an electric circuit breaker, such as an electric high voltage circuit breaker said working cylinder including a base body 2. The base body 2 is constructed in a two part manner.

The base body 2 is produced from a first component, namely a cylinder head 3, and a second component, namely a cylinder body 4, and said components are connected to one another.

Figure 2:
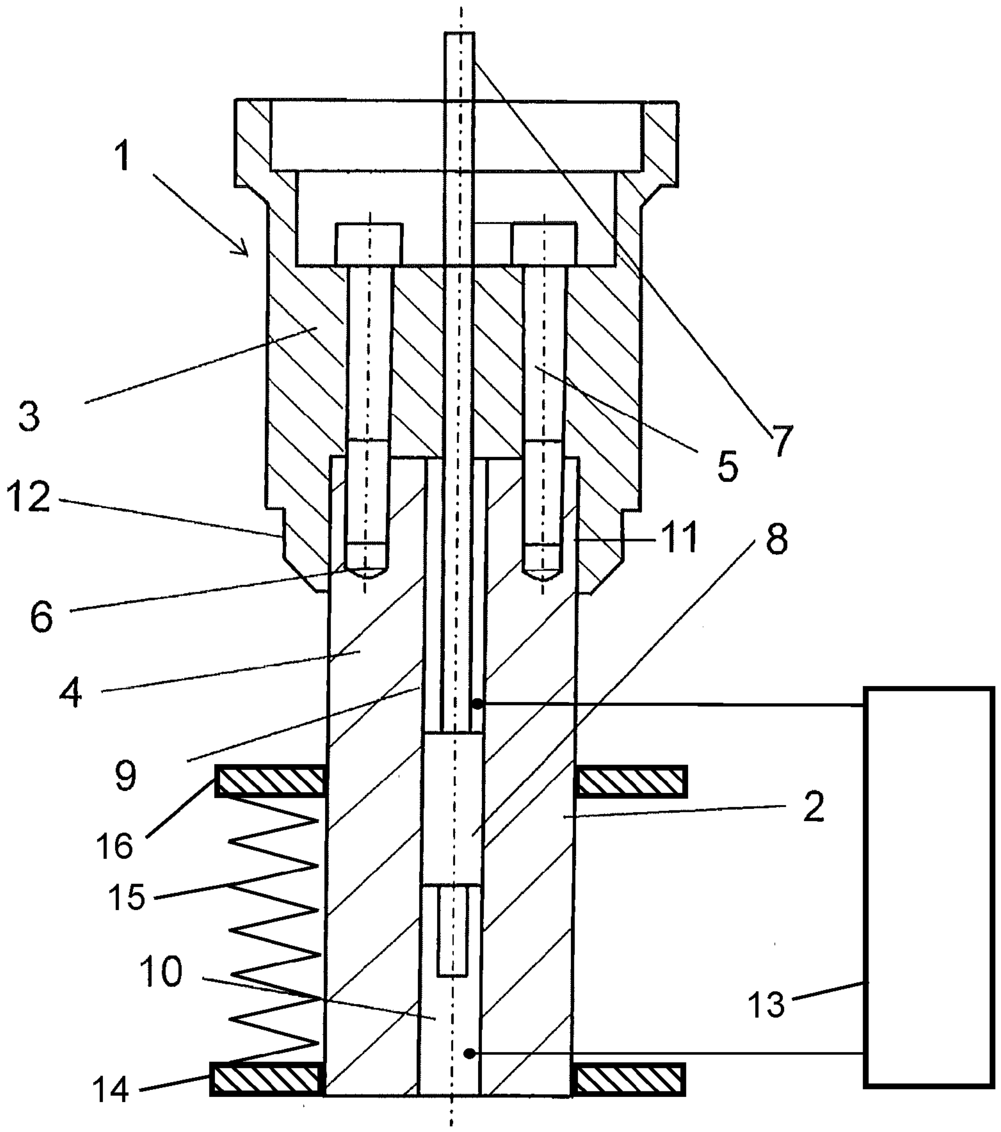
FIG. 2 illustrates a sectional view of the working cylinder in accordance with FIG. 1 in which it is illustrated that the piston rod is received and guided in a central through-going passage in the working cylinder in accordance with an exemplary embodiment of the present disclosure.

FIG. 2 illustrates a sectional view of the working cylinder in accordance with FIG. 1 in which it is illustrated that the piston rod is received and guided in a central through-going passage in the working cylinder in accordance with an exemplary embodiment of the present disclosure. FIG. 2 shows that the exemplary cylinder head 3 is connected to the cylinder body 4 in a non-positive locking manner. The cylinder head 3 and the cylinder body 4 are connected to one another by through screws.

Screws 5 are provided for this purpose and said screws engage in the threaded bores 6 of the cylinder body 4.

Figure 3:
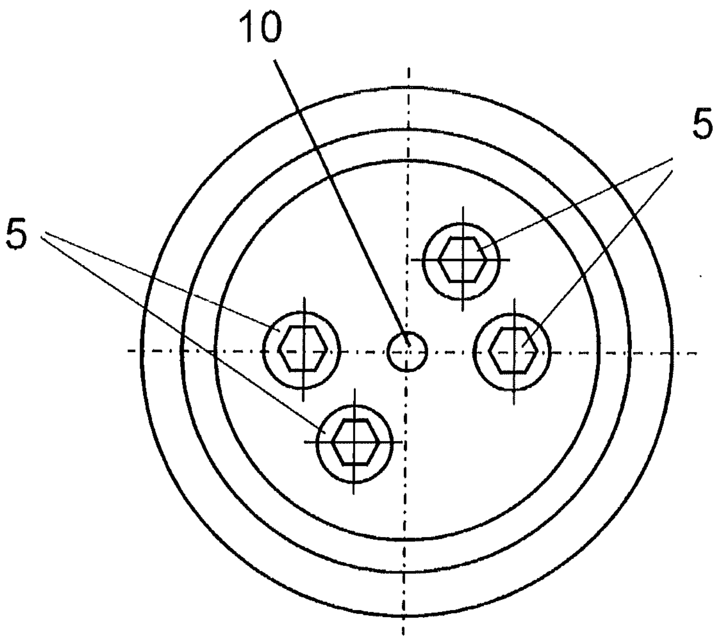
FIG. 3 illustrates a further sectional view of the working cylinder in accordance with FIG. 1, wherein screws are illustrated that connect the cylinder head and the cylinder body to one another in a non-positive locking manner in accordance with an exemplary embodiment of the present disclosure.

FIG. 3 illustrates a further sectional view of the working cylinder in accordance with FIG. 1, wherein screws are illustrated that connect the cylinder head and the cylinder body to one another in a non-positive locking manner in accordance with an exemplary embodiment of the present disclosure. FIG. 3 shows a sectional view of an exemplary embodiment in which four screws are provided.

A piston rod 7 is guided in a working cylinder 1. The piston rod 7 includes a piston 8 that is in contact with a running surface 9 of the cylinder body 4. The piston rod 7 is in addition in contact with the cylinder head 3. The piston rod 7 is positioned in a coaxial manner with respect to the working cylinder 1 and is received in a central through-going passage 10 in the working cylinder 1. The piston rod 7 travels up and down in the working cylinder 1. A moving contact member (not illustrated) of an electric circuit breaker is actuated by through the piston rod 7.

The cylinder head 3 includes a cylindrical cut-out 11 in which the cylinder body 4 is in part received.

The cylinder body 4 is embodied as a cylindrical component. The cylinder head 3 includes a stepped exterior circumferential surface 12.

Diverse components can be mounted on side surfaces and/or end faces of the cylinder head 3.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

1 Working Cylinder
2 Base body
3 Cylinder Head
4 Cylinder Body
5 Screws
6 Threaded Bores
7 Piston Rod
8 Piston
9 Running Surfaces
10 Central Through-going Passage
11 Cylindrical Cut-out
12 Exterior Circumferential Surface
13 Hydraulic Pressure Source
14 Base Plate
15 Mechanical Spring
16 Thrust Ring

What is claimed is:

1. A drive for an electric circuit breaker of a high voltage switching device, comprising:

a mechanical resilient energy storage device; and
a working cylinder including a base body,
wherein a piston rod is guided in the working cylinder and a moving contact member of the electric circuit breaker is actuated via the piston rod,
wherein the base body is formed of two separate components including a cylinder head and a cylinder body, and wherein said two separate components are fastened to one another,
wherein a thrust ring is guided on an outer surface of the cylinder body to compress mechanical springs in the mechanical resilient energy storage device, and wherein an outer contour of the cylinder head is used as a bearing surface for supporting the thrust ring.

2. The drive as claimed in claim 1, wherein the two separate components are fastened to one another via screws.

3. The drive as claimed in claim 1, wherein a base plate is fastened to the cylinder body, which base plate is used as a counter surface for the mechanical springs.

4. The drive as claimed in claim 1, wherein a contour is incorporated into the cylinder head as a damping ring.

5. The drive as claimed in claim 1, wherein the piston rod includes a piston that is in physical contact with a running surface of the cylinder body.

6. The drive as claimed in claim 1, wherein the piston rod is positioned co-axially with respect to the working cylinder and is received in a central through-going passage in the working cylinder.

7. A drive for an electric circuit breaker of a high voltage switching device, comprising:

a mechanical resilient energy storage device; and
a working cylinder including a base body,
wherein a piston rod is guided in the working cylinder and a moving contact member of the electric circuit breaker is actuated through the piston rod,
wherein the base body is formed of separate first and second components, and wherein said first and second components are connected by insertion of the first component into a cutout of the second component and are fastened to one another,
wherein a thrust ring is guided on an outer surface of the second component to compress mechanical springs in the mechanical resilient energy storage device, and
wherein an outer contour of the second component is used as a bearing surface for supporting the thrust ring of the mechanical energy storage device.

8. The drive as claimed in claim 7, wherein the first and second components are fastened to one another via screws.

9. The drive as claimed in claim 7, wherein the first component is a cylinder head and the second component is a cylinder body.

10. The drive as claimed in claim 9, wherein a base plate is fastened to the cylinder body, which base plate is used as a counter surface for the mechanical springs.

11. A drive apparatus for an electrical circuit breaker of a high voltage switching device, the drive apparatus comprising:

a base including (i) a head including a cut-out defined therein and (ii) a body, the body including a through passage defined by a running surface of the body, and
a rod extending through the base, the rod including a piston arranged in contact with the running surface to reciprocate the rod through the base by hydraulic pressure to actuate the electrical circuit breaker,
wherein the body is received within the cut-out to connect to the head with the body by non-positive locking, and
wherein the rod extends through and contacts the head for guidance.

12. The drive apparatus of claim 11, wherein the body and the head are connected to each other with fasteners extending into the cut-out.

13. The drive apparatus of claim 12, wherein the fasteners extend between the head and the body parallel with the rod.

14. The drive apparatus of claim 11, wherein the piston sections the through passage into pressure areas in fluid communication with at least one hydraulic pressure source to reciprocate the rod through the base by hydraulic pressure to actuate the electrical circuit breaker.

15. The drive apparatus of claim 11, further comprising a thrust ring guided on an outer surface of the body.

16. The drive apparatus of claim 15, wherein the thrust ring compresses mechanical springs in an energy storage device for storing energy for transfer through the drive apparatus.

17. The drive apparatus of claim 16, wherein the base includes a base plate connected with the cylinder body as a counter surface for the mechanical springs.

* * * * *